INVENTOR
JOHN W. LAWSON
BY
ATTORNEYS

Nov. 4, 1947. J. W. LAWSON 2,430,064
DUSTPROOF AND MOISTUREPROOF SWITCH CASING
Filed May 5, 1944 2 Sheets-Sheet 2

INVENTOR
JOHN W. LAWSON
BY
Spencer, Hardman & Fehr
his ATTORNEYS

Patented Nov. 4, 1947

2,430,064

UNITED STATES PATENT OFFICE 2,430,064

DUSTPROOF AND MOISTUREPROOF SWITCH CASING

John W. Lawson, Anderson, Ind., assignor to General Motors Corporation, Detroit, Mich., a corporation of Delaware Application May 5, 1944, Serial No. 534,269

13 Claims. (Cl. 200—168)

1

This invention relates to improvement in electric switches.

This application is a continuation in part of application Serial No. 494,199, filed July 10, 1943.

An object of the present invention is the provision of means for rendering the casing which houses the switching means dust proof and moisture-proof. In carrying out the object of the present invention there are provided compressible bodies in the opening through which terminals project to the interior of the casing and also a compressible body at an opening in the casing through which opening an actuating member or plunger rod projects into the interior of the casing.

Further objects and advantages of the present invention will be apparent from the following description, reference being had to the accompanying drawings wherein a preferred embodiment of the present invention is clearly shown.

Figure 1:
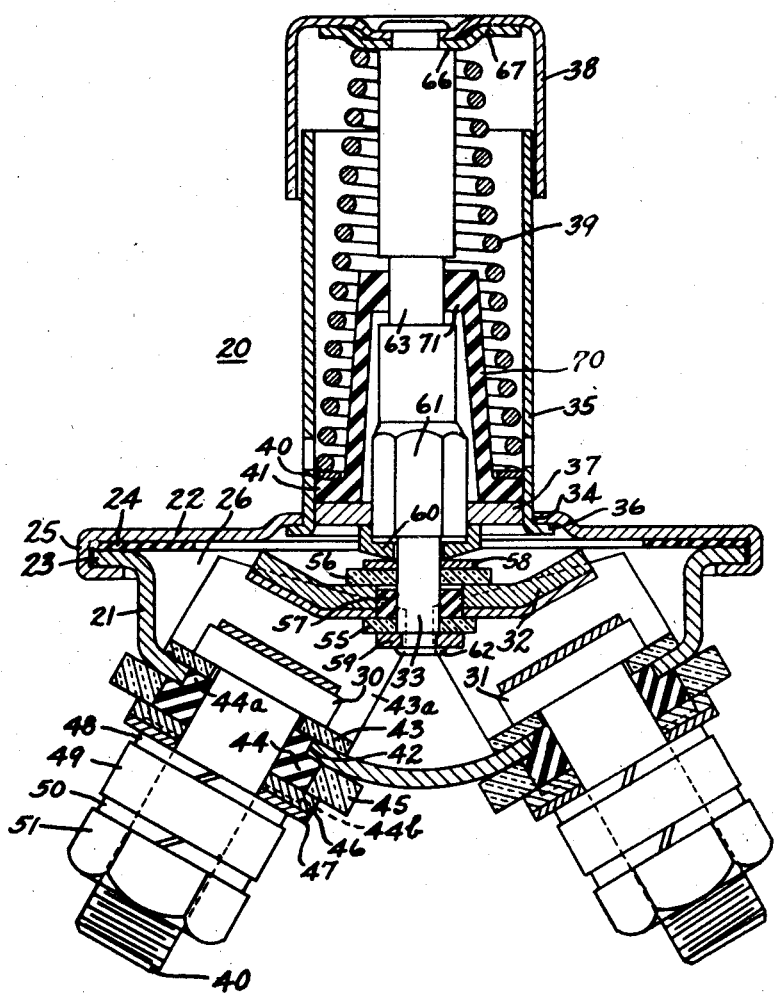
Fig. 1 is a sectional view of a switch illustrating one embodiment of the present invention used with a starting switch.

Referring to Fig. 1, a switch is designated in its entirety by numeral 20 which in the present instance comprises a metallic cup-shaped member 21 and a metallic closure 22. The member 21 is provided with a peripheral flange 23 upon which rests a perforated soft rubber gasket 24. The gasket is secured in place by bending over the extremities of the closure member around the flange 23 as indicated by the U-shaped portion 25 to form a chamber 26. When the gasket 24 is clamped between the flange 23 and the closure 24 the gasket is sufficiently compressed to provide a dust or moisture-proof seal thereat.

The switch housing comprising the member 21 and closure 22 encloses stationary contacts 30 and 31. Arranged at an angle to each other which are engaged by a movable contact 32 insulatingly supported by a plunger rod 33. The closure 22 is provided with an opening 34 to receive a sleeve 35. The sleeve is formed with an outwardly extending flange 36 overlying the bottom side of the closure and joined to the closure by brazing for example to provide a dust proof and water proof seal. Within the sleeve 35 is secured in any suitable manner a guide washer 37 having a non-rounded central opening.

2

The plunger rod or actuating member 33 carries a cap 38 which telescopes the upper end of the sleeve 35. A spring 39 which surrounds the rod 33 is disposed between the cap 38 and a metal ring 40 resting upon a flange 41 of a resilient boot 42, of soft non-porous rubber, for example. The spring 39 is held under compression and operates to separate the contact 32 from stationary contacts 30 and 31. The spring 39 urges the ring 40 and the flange 41 downwardly to compress the flange 41 firmly against the upper face of the washer 37 to form a fluid seal between the flange 41 and the upper face of the washer 37. The force exerted by the spring is sufficient to cause the flange to flow outwardly against the internal walls of the sleeve 35 to provide a dust-proof seal thereat.

It is the purpose of the present invention to protect the switching means, comprising the movable contact 33 and the stationary contacts 30, 31 within the chamber 26 from dust and moisture therefore the stationary contacts are insulatingly supported by the casing 20 to prevent dust and moisture entering the chamber 26 at the terminal receiving opening in the casing. As both stationary terminals are supported in a similar manner only one terminal will be described. The stationary contact 30 forms the head of a threaded terminal bolt 40 and is insulatingly supported by the casing 21 and extends through an aperture 42 which is larger in diameter than the bolt. The bolt passes through a strip 43 of insulating material having ears 43a the arms of which guide movement of the movable contact 32. The bolt passes through a soft rubber body 44 having a projection 44a received by the hole 42 of the member 22. The body fits into an aperture of an insulating washer 45 which in its normal state is larger in longitudinal dimensions than the combined thickness of the housing wall and the washer 45 as indicated by dotted lines 44b. The bolt passes through metal washers 46 and 47, lock washer 48, a copper nut 49, lock washer 50 and a steel nut 51. By tightening the nut 49 against lock washer 48 and the latter against the washer 47 the rubber body 44b is compressed and clamped against the metal member 21 and the projection 44a is compressed between the walls defining the aperture 41 and the bolt 40. Thus, the rod 40 is insulatingly supported from the housing and at the same time the washer is compressed against the bolt and housing so that no dust or moisture can enter the chamber 26 at this juncture.

Another place for dust and water to enter the chamber 26 is through the sleeve 35 due to the fact the cap 38 fits loosely over the cap and since the rod has a sliding fit with the non-rounded opening in the washer 37 so as to be guided vertically in its downward movement as viewed in the drawing. The lower end of the plunger rod insulatingly supports the movable contact 31 which is adapted to bridge the stationary contacts 30 and 31. The movable contact is insulated from the rod 33 by insulating washers 55 and 56 and an insulating bushing 57 disposed between two metallic washers 58 and 59. A metallic cup-shaped washer 60 having a non-rounded recess receives the lower end of the non-rounded portion 61 of the rod the upper end of the washer cooperating with the washer 37 to limit the upward movement of the rod 33. The contact 32, washers 60, 58, 56; bushing 57 washers 55 and 59 are held in assembled relation by riveting over the lower end of the rod 33 against the steel washer 59 as indicated at 62. It will be noted that in the normal position of the switch, that is the open position, the end of the non-rounded portion 61 of the rod 33 does not engage the bottom of the recess in the cup-shaped washer 60 and that the central opening in the washer 60 is slightly larger than the reduced portion of the rod and that the bottom face of the washer is tapered to permit same to rock on the steel washer 56. With this arrangement the reduced portion of the rod 33 is slightly longer than the combined thickness of the bottom wall of the washer 60, the washers 58, 56, 55, 59 and the movable contact 32. Therefore, there is a play between the parts comprising the movable contact assembly so that the force exerted upon the rod in its downward movement will be distributed in a manner that the movable contact 32 will engage the stationary contacts 30 and 31 with substantially equal pressure.

The intermediate portion of the rod 33 is reduced to form an annular groove 63. The upper end of the rod 33 is reduced to provide a shoulder 66 upon which rests a washer 67. The washer 67 and the cap 38 are secured to the rod 33 by riveting over the upper reduced portion of the rod over the cap 38.

The boot 42 of soft rubber or other suitable flexible material seals the sliding fit between the non-rounded portion 61 of the plunger rod and the washer 37. The boot 42 in this instance is preferably cup-shaped and is inverted to provide an apertured top wall 71. The boot is assembled to the rod before the rod is fixed to the cap 38. This is accomplished by forcing the boot over the upper end of the rod until the aperture of the top wall engages the reduced portion 63, said top fitting snugly against the reduced portion 63 so that no dust or water can pass between the walls defining the aperture in the top wall 71 and the rod portion 63. The lower end of the boot is provided with the outwardly extending flange 41 with the lower face thereof engaging the top face of the washer 37 and having the peripheral edge of the flange contacting the inner walls of the sleeve 35. The upper face of the flange supports the metallic ring 40 against which the lower end of the spring 39 rests. Since the spring 39 is held under compression between the ring 41 and the washer 67 the spring exerts an axial force upon the ring 40 to compress the flange 41 firmly against the upper face of the washer 37 and at the same time causing the peripheral edge of the flange to move radially outward to bear firmly against the inner walls of the sleeve 35 thus forming a fluid seal to prevent dirt or moisture from creeping past the flange.

Figures 2, 3:
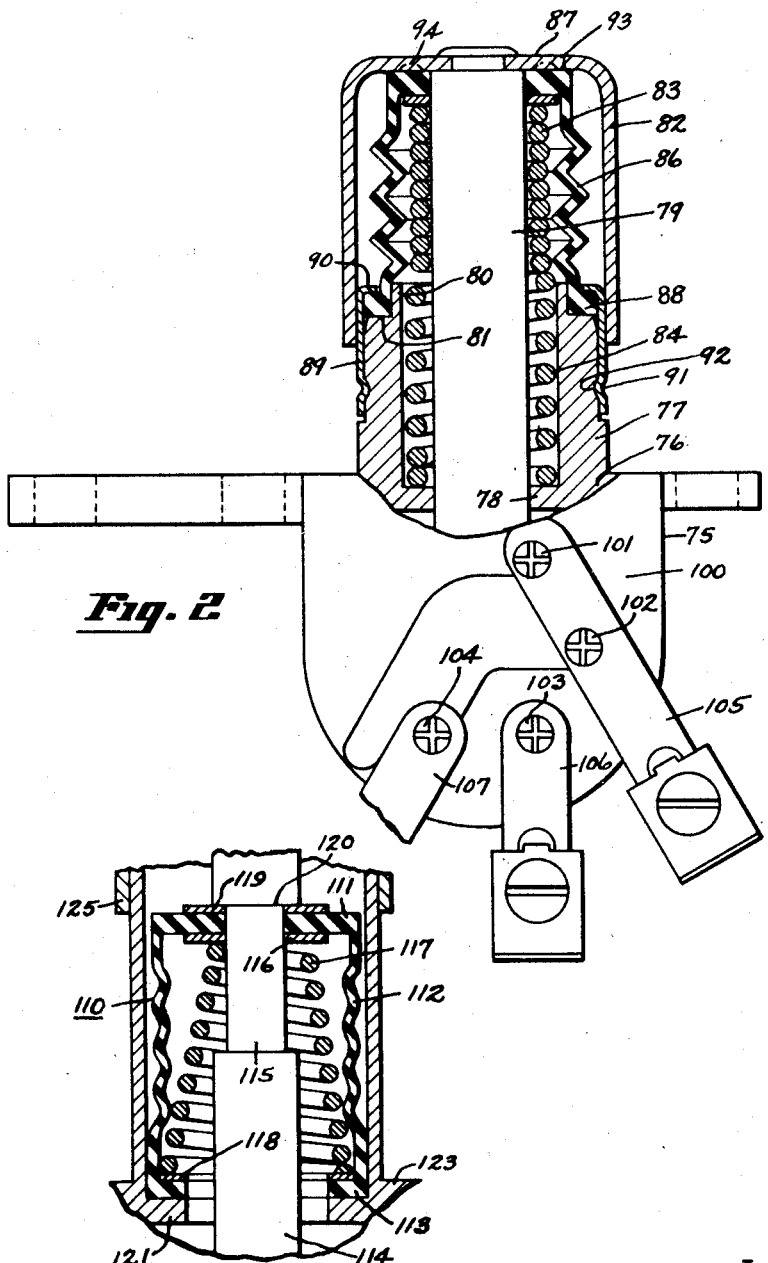
Fig. 2 is a view partly in section and partly in elevation and showing a modified form of the present invention and used with dimmer switch.
Fig. 3 is a sectional view showing another modification of the boot member.

In the modified form of the invention shown in Fig. 2, a switch case, which may be made of die cast metal, comprises a cup-shaped casing 75 having a top wall 76 formed with an aperture. The aperture is surrounded by a tubular portion or sleeve 77 extending outwardly from the top wall. The lower end of the sleeve is spaced from the opening to provide a flat surface or ledge 78. The opening in the top wall 76 may act as a guide for a stem 79. The upper end of the sleeve 77 is reduced as at 80 to provide an external shoulder 81. The upper end of the sleeve is preferably covered by a member or a cup-shaped button 82 attached to the upper end of the stem in any suitable manner.

Before the member or button 82 is attached to the stem 79 a spring having close turns 83 and open turns 84, a metal washer 85 and a boot 86 of resilient material are fitted around the stem. The boot in this instance is made of pliable material, such as soft rubber, and is more or less yielding and elastic. The boot is formed into cup-shape with the side walls thereof corrugated. The boot is inverted, as shown in Fig. 2, to provide a top wall 87 having an aperture which fits snugly against the contour of the stem 79. The lower end of the boot is of such dimension that it will fit snugly around the reduced portion 80 of the sleeve. The lower end of the boot is also provided with an outwardly extending flange 88 with the lower face resting on the flat surface or ledge 81. The flange is placed under compression and held firmly against the shoulder 81. This is accomplished by a sleeve 89 having an internal flange 90 which engages the upper face of the flange 88. The sleeve 89 is press fitted over the sleeve 77 so that the flange 90 compresses the flange 88 and said sleeve is maintained in assembled relation with the sleeve by staking the sleeve or a plurality of points, as at 91, into an annular groove 92 formed on the outer surface of the sleeve 77 thereby maintaining the flange 90 in a state of compression between the flange 90 and the shoulder 81 thus forming a fluid seal to prevent dust or moisture from passing between the shoulder 81 and the flange 90. When the flange 88 is secured the button 82 is attached to the stem, said bottom telescopes the sleeve 89. The bottom side 93 of the closed end of the button is flat, against which an annular bead 94 formed on the outer face of the top wall 87 of the boot bears. The bead is shown in dot-and-dash lines in Fig. 2.

When the button 82 is attached to the stem 79, the spring having turns 83 and 84 is held under compression and operates to press the metal washer 94 upwardly, as viewed in Fig. 2, to urge the top wall 87 of the boot with the bead against the closed end of the button 82. This causes the bead on the top wall 87 to be compressed causing the material of the top wall to be forced against the stem thereby preventing dust and moisture from passing into the interior of the boot.

The open end of the casing 75 is closed by a non-conducting cover 100 which is attached to the casing in any suitable manner and said cover is removable. The cover may be inset on a rabbet with a sealing gasket between the cover and casing (not shown) so as to prevent moisture from entering the casing at that joint.

The cover in this instance supports four terminals 101, 102, 103 and 104 arranged in an arcuate path. The inner faces of the terminals are adapted to cooperate with a movable contact assembly, not shown, within the casing. The movable contact assembly is controlled by the stem 79. The terminals 101 and 102 are connected by a single strap 105 and the terminals 103 and 104 are connected to straps 106 and 107 respectively. This type of switch is especially adapted for dimming headlights of an automobile.

In another form of the invention, shown in Fig. 3, a boot 110, of pliable material, such as soft rubber, is formed with a top wall 111, corrugated side walls 112 and a lower inturned flange 113. The boot 110 is assembled to a rod or stem 114 having a reduced portion 115. Before the boot 110 is assembled the rod 114, a metal washer 116, a spring 117 and a metal washer 118 are assembled within the boot 110. The boot is forced over the upper end of the stem until the top wall engages the reduced portion 115. Since the boot is made of resilient material, the top wall will tend to resume its normal position, thus causing the apertured portion of the top wall to grip firmly the stem so that no dust or moisture can pass between the walls defining the aperture in the top wall 111 and the portion 115. A C-shaped washer 119 may be fitted on the reduced portion 115 as shown in Fig. 3, to provide a seat for the upper face of the top wall of the boot. It is to be understood that the C-washer could be eliminated and the shoulder 120 formed by the reduced portion could operate as a seat against which the top wall 111 could bear, after the boot and its associated elements are assembled upon the stem.

When the boot is assembled with the stem 114 so that the top wall 111 of the boot is below the shoulder 120, the flange 113 will engage an inturned flange or ledge 121 provided in the bottom of an apertured boss or sleeve 122 formed integrally with the top wall of a casing 123. The cross dimension of the lower end of the boot is such that it will have a snug fit with the internal surface of the sleeve. Since the spring 117 is held under compression between the washer 116 and 118 the spring exerts an axial force in two directions upon the washers 116 and 118. The spring 117 causes the washer 116 to compress the top wall 117 of the boot and move the material thereof in directions to bear firmly against the reduced portion 115, thus forming a fluid seal to prevent dust and moisture from creeping past the wall. The spring also operates upon the washer 118 to urge the flange 113 against the ledge 121 and at the same time urge the lower portion of the boot against the inner walls of the sleeve 122, thus forming a fluid seal to prevent dust and moisture from creeping past the flange 113.

When the boot 110 and its associated elements are assembled in position, a cup-shaped member is attached to the upper end of stem 114; said member telescopes the sleeve 122, a fragment of the cup-shaped member is indicated by the reference character 125.

While the embodiment of the present invention as herein disclosed, constitutes a preferred form, it is to be understood that other forms might be adopted, all coming within the scope of the claims which follow.

What is claimed is as follows:

1. The combination of a casing having an opening in one wall; a sleeve extending through the opening; means for securing the sleeve to the wall and providing a fluid seal between the sleeve and wall; a washer fixed within the sleeve; a rod reciprocable in the washer; switching means within the casing controlled by the rod; a rubber boot about the rod, said boot having one end firmly gripping a section of the rod to provide a fluid seal therebetween and having a flange on the other end with the lower face thereof engaging the upper face of the washer and the peripheral edge adjacent the internal walls of the sleeve; and a compression spring disposed between a fixed part of the rod and the upper face of the flange, said spring operating upon the flange to compress same causing the lower face of the flange to bear firmly against the washer and also causing the flange to flow radially outward a sufficient distance so that the peripheral edge of the flange engages the interior of the sleeve and thereby prevent dirt or water entering the sleeve from passing into the interior casing.

2. The combination of a casing having a tubular portion extending outwardly from one wall of the casing; a washer fixed to the inner walls of the tubular portion; a plunger rod reciprocable in the washer; a contact device within the housing and controlled by the rod; a cup-shaped member fixed to the rod and telescoping the tubular portion; a dust proof rubber boot about the rod, said boot having one end firmly gripping the rod and having the other end flared outwardly and located adjacent the outer face of the washer; and a spring disposed between the cup-shaped member and the flared end of the boot for compressing the said flared end against the washer and the interior walls of the tubular portion.

3. The combination of a casing having a tubular sleeve extending outwardly from one wall of the casing; a washer fixed to the internal walls of the sleeve; a plunger rod reciprocable in the washer; a contact device within the housing and controlled by the rod; a cup-shaped member fixed to the rod and telescoping the sleeve; a soft non-porous rubber boot about the rod and located above the washer, said boot having an upper internal flange and a lower flaring flange, said internal flange being of a diameter less than an intermediate portion of the rod and being compressed from normal position when the rod passes through the flange and tending to return to its normal position by its own resiliency after said flange is in contact with the intermediate portion, said lower flange being substantially equal to the internal diameter of the sleeve and adjacent the outer face of the washer; and a compression spring disposed between the cup-shaped member and the lower flange of the boot, said spring normally urging the cup-shaped member and rod in one direction and exerting a downward force upon the lower flange to cause the lower face of the flange to engage firmly the upper face of the washer and also cause the periphery of the lower flange to flow outwardly and firmly engage the internal walls of the sleeve whereby dirt and moisture is prevented from entering the housing from said sleeve.

4. The combination of a casing having a tubular portion extending outwardly from one wall of the casing; a guide member supported in a fixed relation relative to the inner walls of the tubular portion; an operating rod extending through the guide member and into the casing; a movable contact within the casing and insulatingly supported by the rod; a dust proof boot of yieldable material about the rod, said boot having one end firmly gripping the rod to provide a fluid seal therebetween and having the other end flared outwardly and engaging portions of the guide member adjacent the internal walls of the tubular portion of the casing; and a compression spring disposed between a relatively fixed part carried by the rod and the flared end of the boot, said spring compressing the flared end firmly against the guide member and against the interior walls of the tubular portion to provide a fluid seal therebetween whereby dirt and moisture is prevented from entering the casing from the tubular portion.

5. The combination of a casing having an outwardly extending tubular portion about an opening in one wall of the casing, the cross dimension of the opening being less than the cross dimension of the tubular portion to provide a shoulder; an operating rod extending through the opening and into the casing; a contact device within the casing and controlled by the rod; a cup-shaped member fixed to the rod and telescoping the tubular portion; a dust proof boot of elastic material about the rod, said boot having a reduced portion firmly gripping the rod and having a flanged portion engaging the shoulder; and a compression spring disposed between the cup-shaped member and the flanged portion of the boot for compressing the flanged portion against the shoulder and the interior walls of the tubular portions and thereby preventing any dirt and moisture entering the tubular portion from passing into the interior of the casing.

6. The combination of a casing having an opening in one wall thereof; an operating rod extending through the opening and into the casing; a circuit closing member within the casing controlled by the rod; a boot of pliable non-conducting material such as soft rubber, said boot having a top wall provided with an opening of such shape and dimensions as to fit snugly the rod after assembly therewith; spring means for actuating the rod in one direction, said spring having one end thereof engaging and compressing a portion of the boot against the casing about the opening and thereby sealing the casing from outside atmosphere.

7. The combination of a casing having an opening in one wall thereof; an operating rod extending through the opening and into the casing; a circuit closing member within the casing controlled by the rod; a boot of pliable non-conducting material such as soft rubber, said boot having a top wall provided with an opening of such shape and dimensions as to fit snugly the rod after assembly therewith and having an internal flange spaced from the top wall adapted to engage a surface of the casing surrounding the opening; and spring means within the boot having one end thereof engaging the flange and compressing same against the surface surrounding the opening whereby dust and moisture is prevented from entering the casing through the opening of the casing.

8. The combination of a casing having an outwardly extending sleeve about an opening in one wall of the casing, the cross dimension of said sleeve being greater than the cross dimension of the opening to provide a flat surface around the opening; an operating rod extending into the sleeve and through the opening; a circuit closing member within the casing controlled by the rod; a boot of pliable non-conducting material such as soft rubber, said boot having a top wall provided with an opening of such shape and dimensions as to fit snugly a reduced portion of the rod after assembly therewith; and a spring surrounding the rod and located within the boot, said spring operating to compress the top of the boot between one end of the spring and a shoulder provided by the rod while the other end of the spring compresses the lower end of the boot between it and the flat surface about the opening and thereby preventing dust and moisture from passing into the casing through the opening.

9. The combination of a casing having a guide opening in one wall of the casing; an operating rod extending through the opening and into the casing; a circuit closing member within the casing controlled by the rod; a boot of pliable non-conducting material, such as soft rubber, said boot being located outside the casing and having one end reduced so as to fit snugly around the rod after assembly therewith to provide a seal therebetween; and resilient means for urging the rod in one direction and also operating to compress a gasket portion at the other end of the boot against a plane shoulder provided by the casing to provide a second seal, said mentioned seals preventing any foreign matter from entering the interior of the casing through the guide opening.

10. The combination of a casing having an opening in one wall and providing a plane surface thereabout; an operating rod extending through the opening; means for guiding the rod substantially in a straight line through the opening; a circuit closing member within the casing controlled by the rod; a moisture proof boot of yieldable material about the rod and positioned beyond the opening outside the casing, said boot having one end gripping the rod to form a seal between the boot and the rod and having the other end provided with a gasket portion engaging the plane surface about the opening; and resilient means for urging rod in one direction, said resilient means also operating to compress the gasket portion into sealing engagement with the plane surface and thereby preventing dust and moisture from passing into the casing through the opening.

11. The combination of a casing having an opening in one wall thereof; an operating rod extending through the opening and into the casing; a mechanism within the casing controlled by the rod; an impervious boot of yieldable material about the rod, said boot having a portion firmly gripping the rod to form a fluid seal therebetween and having a portion capable of being flared radially outward adapted for axially directed sealing contact with a complementary surface about the opening; and a compression spring for urging the rod in one direction and having one end thereof in axially directed abutment with said flared portion of the boot enforcing sealing contact thereof with the casing and thereby prevent foreign matter from entering the casing through the opening.

12. The combination of a casing having an opening in one wall; an operating rod extending through the opening and into the casing; control means within the casing adapted to be actuated by the rod; a boot composed of flexible fluid tight material including a flange at one end adapted for engagement with an abutment provided by the rod and a second flange at the other end adapted for axially directed sealing contact with a complementary surface on the casing about the opening, and a thin bellow portion intermediate the flanges integral therewith and spaced from the rod portion encircled thereby, and a coil compression spring confined within the boot having its respective ends in axially directed abutment with the flanges enforcing sealing contact thereof with the abutment and the casing and also for urging the rod in one direction, and having its convolutions spaced from the bellow portion to permit normal collapse thereof when the rod is actuated in the opposite direction, said seals preventing any foreign matter from entering the casing through said opening.

13. The combination of a casing having an opening in one wall and providing a plane surface thereabout; an operating rod extending through the opening; means within the casing controlled by the rod; an impervious boot of yieldable material about the rod, said boot having a portion firmly gripping the rod to form a fluid seal therebetween and having another portion spaced from the first mentioned portion in sealing contact with a surface about the opening; a spring for actuating the rod in one direction and having at least one end thereof bearing against one of the portions of the boot to assist in rendering said portion in sealing engagement with its respective part and whereby dust and moisture is prevented from entering the casing through the opening of the casing.

JOHN W. LAWSON.

REFERENCES CITED

The following references are of record in the file of this patent:

UNITED STATES PATENTS

| Number | Name | Date |
|---|---|---|
| 1,560,580 | Joyce | Nov. 10, 1925 |
| 1,996,891 | VanValkenburg | Apr. 9, 1935 |
| 809,262 | Hood | Jan. 2, 1906 |
| 1,026,429 | Coolidge | May 14, 1912 |
| 2,357,973 | Robbins | Sept. 12, 1944 |